United States Patent Office 3,523,734
Patented Aug. 11, 1970

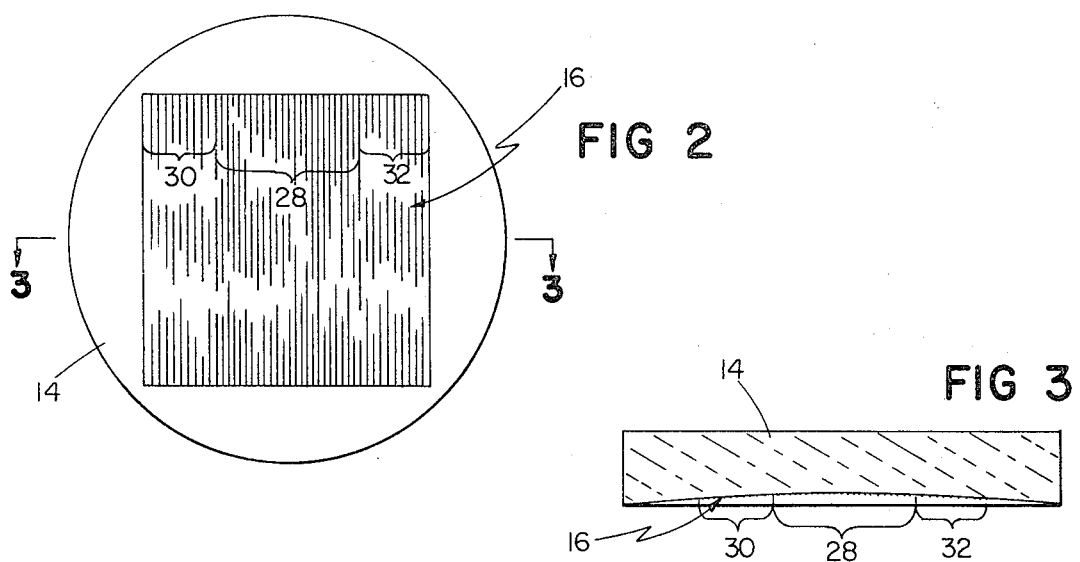
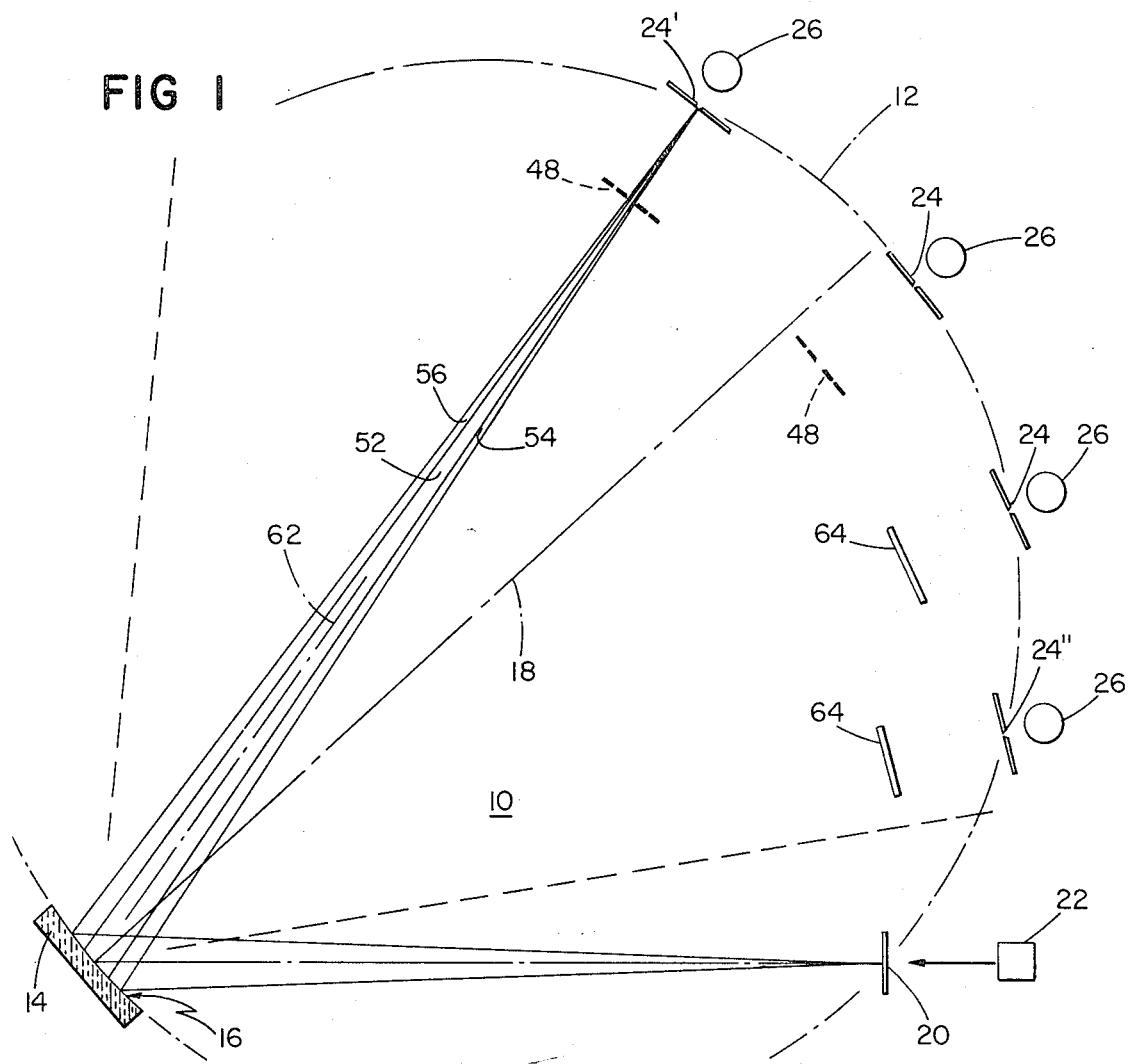

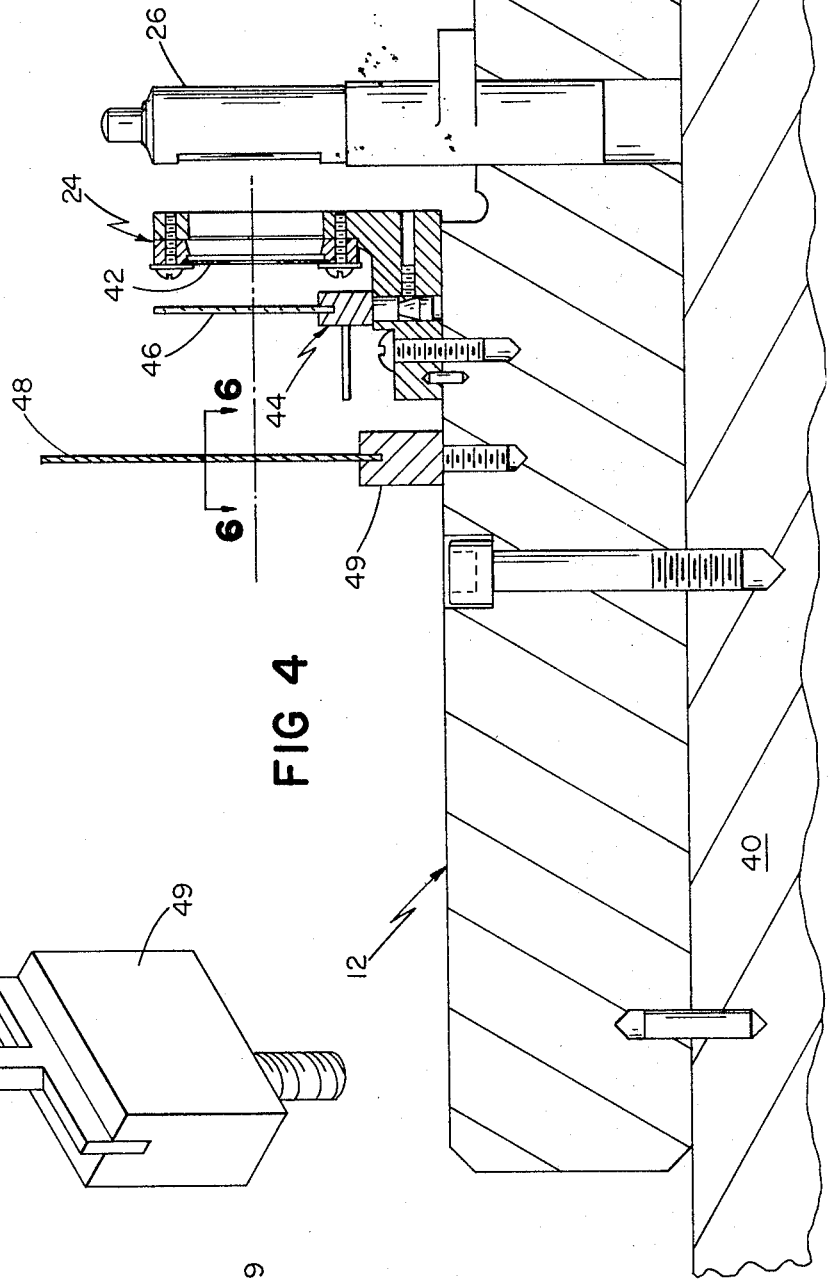

3,523,734
DIFFRACTION GRATING SPECTROMETER WHEREIN THE GRATING HAS FIRST AND SECOND GROUPS OF GROOVES
Richard Keith Brehm, Lexington, Joseph Stanislaw Ilowski, Hyde Park, and Richard Fiske Jarrell, Waban, Mass., assignors, by mesne assignments, to Fisher Scientific Company, Pittsburgh, Pa., a corporation of Pennsylvania
Filed Dec. 18, 1967, Ser. No. 691,336
Int. Cl. G01j 3/40
U.S. Cl. 356—79            12 Claims

ABSTRACT OF THE DISCLOSURE

A direct reading spectrometer has an entrance slit and a series of exit slits disposed along the focal curve of the Rowland circle (75 cm. in diameter). A rectangular grating is formed on a concave spherical surface that lies on the Rowland circle. The grating has a center section thirty mm. high and twenty mm. wide that is ruled with 2400 grooves/mm. and two identical side sections, each thirty mm. high and ten mm. wide that are ruled with 1600 grooves/mm. Two superimposed spectra are produced by this grating and these spectra are separated either by filters or masks disposed between the grating and the radiation sensors disposed behind the exit slits.

SUMMARY OF INVENTION

This invention relates to spectrochemical analysis and to spectrometers for use in connection with such analysis and has particular use in connection with (although not limited to) spectrometers of the type that have a series of exit slits disposed along a focal curve.

In direct reading spectrochemical analysis, it is desirable to achieve sufficient dispersion to prevent interference between adjacent lines of differing elements while maintaining a wide wavelength range, all in an instrument of manageable dimensions. According to the dispersion equation, $$d\lambda/dl = (D/R) \cos \beta$$

where $d\lambda/dl$ is the "reciprocal linear dispersion" and is normally given in terms of wavelength increments per unit length, for example, A./mm.; R is the radius of curvature of the grating; D is the grating spacing; and $\beta$ is the angle of diffraction, related to the wavelength $\lambda$ by the well known equation:

$$n\lambda = D(\sin \alpha + \sin \beta)$$

Thus, dispersion (the inverse of the "reciprocal linear dispersion") can be increased either by increasing the radius of curvature of the grating (hence the physical size of the focal curve of the Rowland circle and thus making the instrument large) or by decreasing the grating spacing (by increasing the number of grooves per unit width).

However, current limitations on the art of ruling place the minimum practical grating spacing at about 2,400 grooves/mm.; and decreasing the spacing has the further necessary effect of increasing $\beta$, the angle of diffraction, to the point of severely limiting the wavelength range of the instrument; usually the maximum $\beta$ optically practical in such a spectrometer is about 45–50°.

Consider, for example, a direct reading spectrometer having a radius of curvature (diameter of the Rowland circle) of 75 cm., a convenient physical size, with a grating ruled to 2,400 g./mm. Although an acceptable dispersion (about 5.6 A./mm.) is achieved, the wavelength range is limited, because of the interacting optical parameters, to about 1900 A. to 5000 A., whereas the upper wavelength of interest in spectrochemistry is at least about 7500 A. With conventional gratings, these upper wavelengths could be reached, without using a second grating, only by increasing the radius of curvature and thus the physical size of the instrument while decreasing the spacing on the grating to preserve the dispersion. At the same time, one would have to try to avoid significantly increasing the angle of diffraction if the total angular range is to include a sufficiently large number of wavelengths.

It is an object of the invention to provide a novel and improved spectrometer. Another object is to provide a direct reading spectrometer having a wavelength range sufficient for most spectrochemical analyses. It is a further object to provide a direct reading spectrometer of the type having a series of exit slits disposed along a focal curve of the Rowland circle capable of a sufficient range of wavelengths for most spectrochemical analyses while using a conventional grating system, all in a relatively simple, compact, and economically constructed instrument. It is another object to provide such an instrument having a dispersion sufficient to prevent substantial interference between adjacent lines of differing elements during spectrochemical analyses. It is still another object to provide a new dispersing structure capable of achieving these results without changing gratings.

The invention features a grating structure having a multiplicity of grooves thereon which are formed in first and second groups as a series of grating portions on an integral substrate. The grooves in each group are parallel and equidistantly spaced; and each grating group has a different number of grooves per unit width.

In preferred embodiments, the grating groups are formed in series on a continuous surface which is a segment of a sphere; and the widths of the grating groups are proportioned to provide an appropriate relative intensity of the two spectra produced and are symmetrically arranged. In a specific embodiment, the first grating group consists of a single grating element, and the second grating group consists of two grating elements of equal width, placed one on either side of the first grating group; the first group is twice the width of each adjacent grating element of the second group, and all three grating elements form a rectangular diffracting area on a segment of a sphere.

The invention incorporated in a direct reading spectrometer includes sensing structure disposed along the focal curve of the Rowland circle to sense the intensity of predetermined portions of spectra focussed at the curve. The grating structure produces overlapping spectra and disposed between the grating structure and the sensing structure is structure for separating the overlapping spectra produced by the grating portions. In a particular embodiment, where the grating structure consists of a central portion of a first groove spacing and two adjacent elements of a different groove spacing, the structure for separating overlapping short wavelength spectra comprises a light baffle either having a central aperture for passing rays diffracted from the first grating portion and blocking rays from the adjacent grating elements, or a simple mask for blocking rays from only the first grating portion; and the structure for separating longer wavelength spectra comprises filters. The invention permits a substantial extension of the spectral range to be achieved in a compact and relatively simple instrument.

Other objects, features and advantages will appear from the following description of a particular embodiment of the invention, taken together with the attached drawings, in which:

FIG. 1 is a top diagrammatic view of a spectrometer system constructed in accordance with the present invention;

FIG. 2 is a front view of dispersing structure embodying the present invention;

FIG. 3 is a sectional view along line 3—3 of FIG. 2;

FIG. 4 is a side view of an exit slit support structure including one form of spectra separation structure employed in the spectrometer shown in FIG. 1;

FIG. 5 is a top diagrammatic view of the exit slit and spectra separation structure shown in FIG. 4;

FIG. 6 is a perspective sectional view of the spectra separation structure taken along the line 6—6 of FIG. 4; and FIG. 7 is a perspective sectional view (similar to FIG. 6) of a second form of a baffle structure.

DESCRIPTION OF PARTICULAR EMBODIMENT

With reference to FIG. 1, there is shown a spectrometer system 10 having a semicircular focal curve structure 12 in the shape of a segment of a Rowland circle that is 75 cm. in diameter. The grating structure 14 has a spherical diffracting surface 16 of the same radius and lies on the Rowland circle. The length of normal 18 from the center of diffracting surface 16 to the focal curve is 75 cm.

Entrance slit structure 20 is disposed on the focal curve structure 12 and disposed behind that structure is an extended radiation source diagrammatically indicated at 22. Radiation from that source passes through slit 20 onto diffracting surface 16. Slit 20, in this embodiment, is 588.568 mm. from the center of diffracting surface 16, while source 22 is 233 mm. to the rear of slit 20.

A series of exit slits 24 are disposed along focal curve structure 12 between the limits of the maximum practical optical wavelength range, exit slit 24′ being at one such limit and the other limit being designated at 24″. The slits are arranged along focal curve structure 12 at positions corresponding to selected spectral lines of interest. Entrance slit 20 and exit slits 24 in the embodiment shown, each have a height of twenty mm. and a width (depending on analytical requirements) from 0.02 to 0.150 mm. Each slit lies on a corresponding line drawn from the center of the diffracting surface 16 through the point at which the wavelength of interest intersects the Rowland circle. Disposed behind each exit slit is a suitable photomultiplier unit 26.

Diffracting surface 16 is a concave spherical surface on grating structure 14 as indicated in FIGS. 2 and 3. Diffracting surface 16 includes center grating element 28 and identical side elements 30, 32. Each element is thirty mm. high (along the direction of the grating lines), elements 30 and 32 being ten mm. wide, and element 28 being twenty mm. wide. Grating structure 14 has a diameter of seventy-five mm. and a thickness consistent with the characteristics of the mechanical support system.

Grating portion 28, as shown in FIG. 2, has 2400 grooves/mm. and provides an effective wavelength range in this instrument from about 1900 A. (detected at slit 24′) to about 5000 A. (detected at slit 24″). Elements 30, 32 define a second grating portion ruled with 1600 grooves/mm., and that portion provides an effective wavelength range in the instrument from about 2850 A., (as sensed at exit slit 24′) to about 7500 A. (as sensed at slit 24″).

Thus when light from source 20 impinges grating 14, two superimposed spectra are produced along focal curve structure 12 and hence also at each exit slit 24.

With reference to FIG. 4, the focal curve structure 12 includes a mounting plate 40 on which is mounted a photomultiplier tube 26, the exit slit structure 24, each of which has a slit plane at its front face 42, a fine tuning structure 44 which includes a quartz plate 46 that is mounted for rotation, and a mask 48 that is supported on base 49 in front of the tuning plate 46. The mask is elongated element in the order of one millimeter thick and extends above the slit. Depending on the spectral line desired, the mask may be either a single barrier member 48 of cross-sectional configuration as indicated in FIG. 6, or an apertured barrier member 48′ of cross-sectional configuration as indicated in FIG. 7. The mask dimensions are defined by its front surface 50 (the surface nearer the diffracting element 14) and its rear surface is cut away, as indicated in FIGS. 6 and 7. The type of mask employed at a particular exit slit is a function of which of the two superimposed spectra is to be detected. If a spectral line from the lower wavelength spectra (the spectra from the central grating portion 28) is to be detected, a mask of the type shown in FIG. 7 is utilized while if a spectral line from the higher wavelength spectra (from the outer grating portions 30, 32) is to be detected, a mask of the configuration shown in FIG. 6 is employed. Spectral separation by such masks is possible because of the distinct diffraction portions 28, 30, 32 of the grating structure 16 that produce the two spectra which are superimposed and focused at the exit slit 24. As indicated in FIG. 5, the spectra focused at slit 24 include a central beam portion 52 which emanates from the central grating portion 28 and two side portions 54, 56 each of which emanates from the grating portions 30, 32, respectively. Surface 50 at mask 48 is disposed at line 60 which is perpendicular to the line 62 extending from the center of the grating through the center of the exit slit 24. If the mask configuration shown in FIG. 6 is employed, that mask passes the longer wavelength spectral line and blocks the shorter wavelength spectral line, while if the mask of configuration shown in FIG. 7 is employed, the longer wavelength spectral line is blocked and the shorter wavelength spectral line is passed.

Separation of the two superimposed spectral lines may also be accomplished, particularly in the higher wavelength region, by means of a color filter 64 (FIG. 1). This filter may be placed anywhere between the exit slit 24 and phototube 26 or even before the exit slit 24. For example, a color filter may be used to separate the 5,000 and 7,500 angstrom spectral lines at slit 24″. It is however preferred to use masks 48 at the shorter wavelengths in the primary spectrum because of the severe loss of intensity due to poor transmission of filters in the ultraviolet region. Also, for some wavelengths adequate discrimination between the two superimposed spectral lines may be provided by appropriate selection of the detector 26.

In operation of this instrument, light from source 22 passes through entrance slit 20 and impinges on the diffracting surface 16 of grating structure 14. As indicated above, grating portion 28 produces one spectrum and grating portions 30 and 32 produce a second spectrum. The dispersion of the spectrum produced by grating portion 28 is about 5.6 angstroms per millimeter while the dispersion of the second spectrum is about 7.5 angstroms per millimeter. The two superimposed spectra are separated, as by use of the masks or filters, and each selected spectral line passes through exit slit for sensing by photomultiplier 26.

While a particular embodiment of the invention has been shown and described, various modifications will be apparent to those skilled in the art and therefore it is not intended that the invention be limited to the disclosed embodiment or to details thereof and departures may be made therefrom within the spirit and scope of the invention as defined in the claims.

What is claimed is:

1. In a spectrometer having an entrance slit structure, an exit slit structure composed of a series of exit slit elements, said entrance and exit slit structures being disposed along and centered on the same plane of a Rowland circle, a single grating centered on said Rowland circle and disposed in the optical path between said entrance slit structure and said exit slit structure for dispersing radiation passed through said entrance slit structure, said grating having a multiplicity of parallel grooves thereon, said grooves being disposed in first and second groups, the grooves in each group being equidistantly spaced and the number of grooves per unit width in said first group being different from the number of grooves per unit width in said second group, said grating being disposed so that the radiation passed through said entrance slit structure is incident on and dispersed by said first and second groups of grooves to concurrently produce two different spectra, and structure including components individually associated with individual exit slit elements disposed between said grating and said exit slit structure for separating the different spectra produced by said first and second groups of grooves.

2. The instrument of claim 1 wherein said structure for separating said different spectra comprises a color filter.

3. The instrument of claim 1 wherein said structure for separating said different spectra comprises a mask structure located to block radiation from one of said groups of grooves and pass radiation from the other group of grooves.

4. The instrument as claimed in claim 1 wherein said grating grooves are formed on a segment of a sphere.

5. The instrument as claimed in claim 1 wherein said first and second groups of grooves are of equal width.

6. The instrument as claimed in claim 1 wherein said first and second groups of grooves are arranged symmetrically with respect to said optical path.

7. The instrument as claimed in claim 6 wherein said first group of grooves are formed as a single unit and said second group of grooves are formed as two separate units of equal width, placed one on either side of said first group of grooves.

8. The instrument as claimed in claim 7 wherein the grooves on said two separate units are contiguous with the grooves of said single unit.

9. The instrument as claimed in claim 8 wherein said first and second groups of grooves are of equal width.

10. For use in a spectrometer, having an entrance slit structure and an exit slit structure, a grating element adapted to be disposed in the optical path between said entrance slit structure and said exit slit structure for dispersing radiation passed through said entrance slit structure, said grating element having a spherical surface, a multiplicity of parallel grooves on said spherical surface, said grooves being disposed in first and second groups, first and second groups of grooves being arranged symmetrically on said grating surface with said first group of grooves being formed as a single grating unit and said second group of grooves being formed as two separate units of equal width, placed one on either side of said first group of grooves, the grooves in each group being equidistantly spaced and the number of grooves per unit width in said first group being different from the number of grooves per unit width in said second group, said grating element being adapted to disperse radiation passed through said entrance slit structure to produce two different spectra concurrently.

11. The grating structure as claimed in claim 10 wherein said first group of grooves is twice the width of the grooves formed on each of said separate units.

12. The grating structure as claimed in claim 10 wherein the grooves of said two separate units are contiguous with the grooves on said single grating unit.

References Cited

UNITED STATES PATENTS

| 2,453,164 | 11/1948 | Swings | 356—79 |
| 3,045,532 | 7/1962 | Staunton | 350—162 |
| 3,363,525 | 1/1968 | Teeple | 356—79 X |

FOREIGN PATENTS

| 965,543 | 7/1964 | Great Britain. |

WILLIAM F. LINDQUIST, Primary Examiner

A. L. BIRCH, Assistant Examiner

U.S. Cl. X.R.

351—162; 356—98